UNITED STATES PATENT OFFICE.

JOHN STANSFIELD, OF BROOKLYN, NEW YORK.

IMPROVED CEMENT.

Specification forming part of Letters Patent No. 50,184, dated September 26, 1865.

*To all whom it may concern:*

Be it known that I, JOHN STANSFIELD, of Brooklyn, in the county of Kings and State of New York, have invented a new and Improved Cement Composition; and I do hereby declare that the following is a full, clear, and exact description thereof, which will enable others skilled in the art to fully understand and make use of the same.

This invention relates to the production of a cement adapted for the splicing of machine-belts and other purposes where the article is subjected to any severe strain, and consists in forming the cement of six ounces bisulphate carbon, five ounces gutta-percha, one-half ounce isinglass.

The gutta-percha is first thoroughly cut up into small particles, in any suitable manner or machine, and then the carbon poured on it, by which the gutta-percha after a short time becomes completely dissolved, when the isinglass is added and thoroughly mixed with it. The cement is then ready for being used, and when applied to the surface of the leather-splice the carbon immediately commences to penetrate the pores and fibers of the leather, drawing with it the gutta-percha and isinglass held in it in solution, whereby the cement in the joint of the splice becomes, as it were, part of the leather itself, as it is thoroughly incorporated with its fibers, and the belt can be subjected to severe strains without yielding in the least at its joint or splice.

The composition, when applied to the splice, is dried by passing over any suitable heating-furnace or in any other proper manner, and at the same time is hammered together at its joint, so as to make it perfectly close, tight, and firm.

I claim as new and desire to secure by Letters Patent—

The cement composition herein described.

The above specification of my invention signed by me this 27th day of July, 1865.

JOHN STANSFIELD.

Witnesses:
ALBERT W. BROWN,
C. L. TOPLIFF.